April 22, 1924.
J. THOMA ET AL
CULTIVATOR SEEDER
Filed Nov. 17, 1920
1,491,324
2 Sheets-Sheet 1
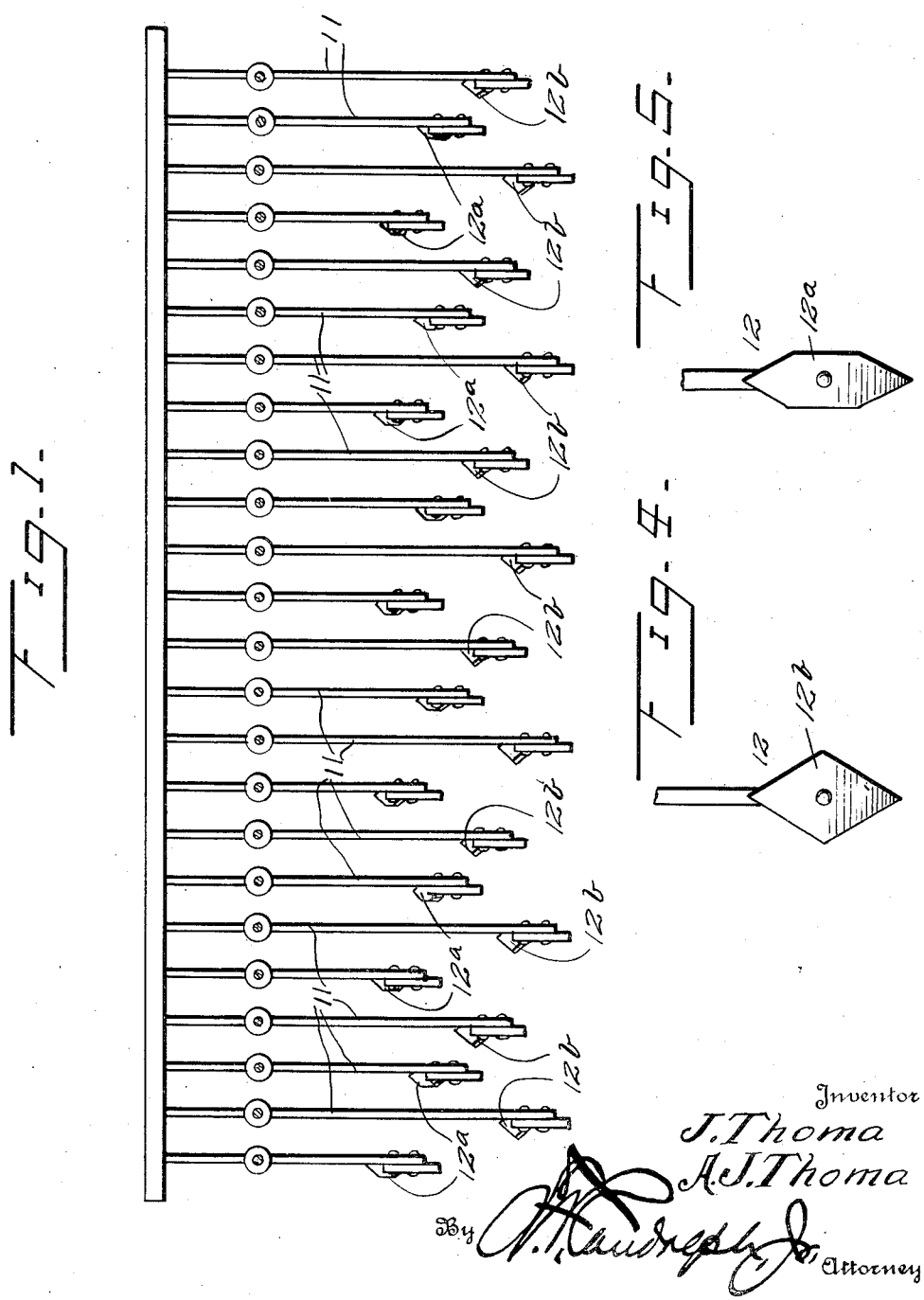

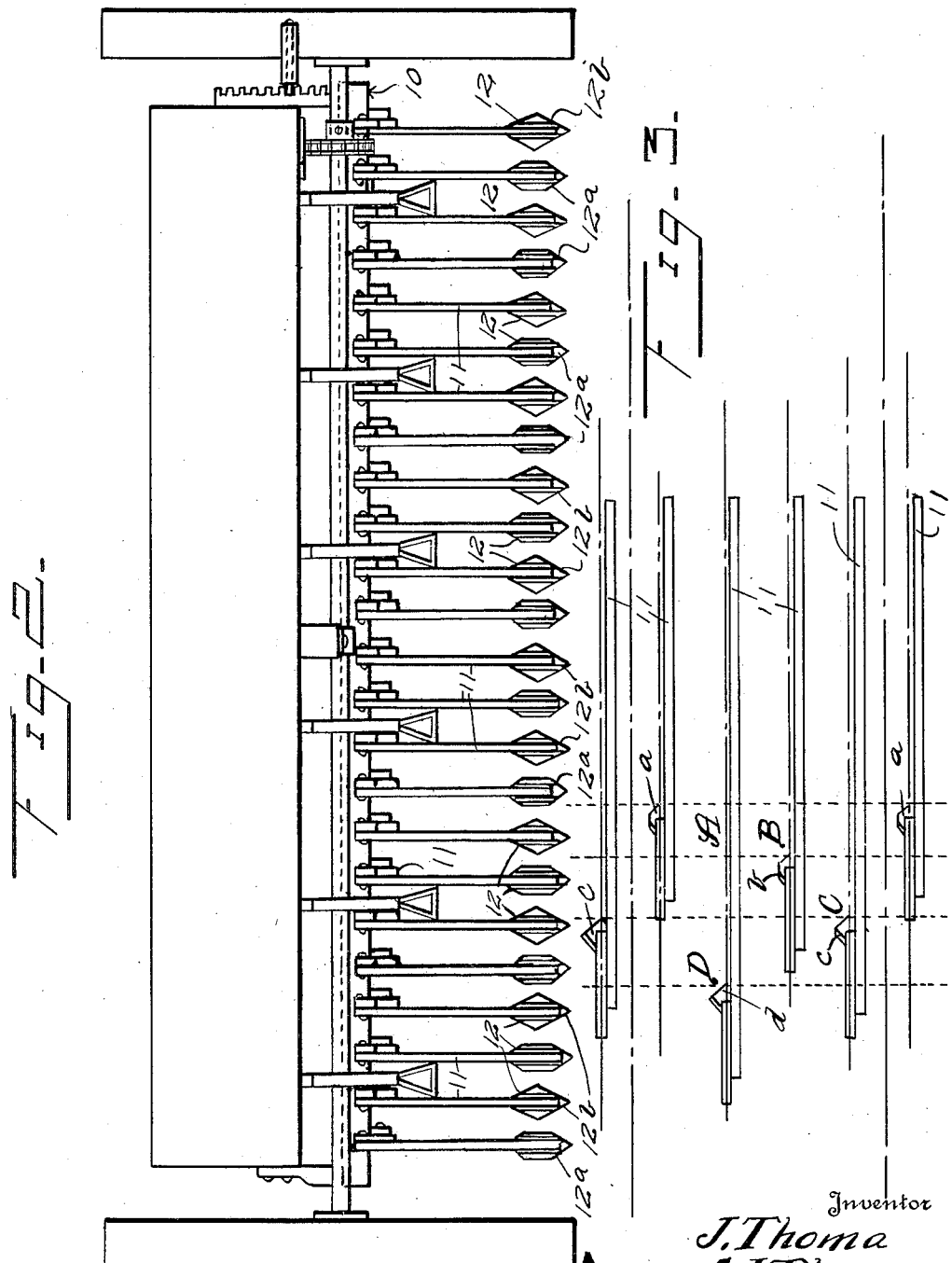

Patented Apr. 22, 1924.

1,491,324

UNITED STATES PATENT OFFICE.

JOSEPH THOMA AND ALVIN J. THOMA, OF WATERTOWN, WISCONSIN.

CULTIVATOR SEEDER.

Application filed November 17, 1920. Serial No. 424,738.

*To all whom it may concern:*

Be it known that we, JOSEPH THOMA and ALVIN J. THOMA, citizens of the United States, residing at Watertown, in the county of Dodge and State of Wisconsin, have invented certain new and useful Improvements in Cultivator Seeders; and we do hereby declare the following to be a full, clear, and exact description of the invention, such as will enable others skilled in the art to which it appertains to make and use the same.

The object of the invention is to provide a combined cultivator and seeder, or more properly speaking a seeder which prepares the soil for the reception of the seed and deposits the same without previous or preliminary preparation and such an implement in which the throwing of large lumps of soil by the cultivating means is avoided.

With the foregoing and related objects in view, the invention consists in a construction and combination and arrangement of parts of which a preferred embodiment is shown in the accompanying drawings, wherein:

Figure 1 is a plan view of a machine embodying the invention.

Figure 2 is a rear view of the same.

Figure 3 is a diagrammatic view in plan, of a section of the seeder to show the relative arrangement of the rows of bits constituting the transverse series and the grouping of the bits.

Figures 4 and 5 are detail views respectively of the advance and following bits or teeth and the bars by which they are carried.

In the illustrated embodiment of the invention, the wheel supported frame 10 carries the usual spring depressed pivotal bars 11, which in turn carry the cultivator or seeder bits 12 preferably of the diamond shape ordinarly employed in this connection.

The cultivator bits or teeth (as they are perhaps more generally termed) are arranged in a transverse series with relation to the path of movement or progress of the apparatus or machine, said series consisting of a plurality of transverse parallel rows of teeth arranged respectively upon the dotted lines designated respectively A, B, C, and D of Figure 3, the interval between the front or foremost row and the sceond row preferably being about five inches while the intervals between the rows B and C and between the rows C and D are preferably about six inches, although it will be understood that slight variations or modifications of these intervals may be adopted without materially affecting the operation or the ultimate result of the action of the apparatus.

The bits or teeth are further arranged in groups of which the members are respectively designated as $a$, $b$, $c$ and $d$, arranged to traverse paths which are at short transverse but preferably equal intervals parallel with the path of progress of the machine, but on respectively different transverse lines, as for example the said bits $a$, $b$, $c$ and $d$, of each group are arranged respectively in the rows A, B, C, and D composing the transverse series of bits or teeth with which the machine is provided. Thus each group consists of a plurality of teeth, in this instance four, which are arranged to traverse different longitudinal paths or paths parallel with the progress of the machine, and are disposed upon different transverse lines, or in different transverse rows forming component parts of the complete transverse series of bits or teeth with which the machine is equipped, the two forward bits or teeth preferably being narrow as indicated at $12^a$ and the two rear teeth being wide or representing complete diamond form as indicated at $12^b$. Moreover, the said teeth or bits are preferably spaced transversely to traverse paths which are approximately at one-half or less than one half of the intervals usually allowed between the bits or teeth of cultivators or seeders, or in other words at intervals of about three inches, so that taking into consideration the staggered arrangement of the teeth or bits, or the arrangement of the members of each group of teeth or bits on different transverse lines or in different transverse rows, a complete breaking up, and cultivating the surface of the soil is effected.

The result of the operation of parts as described is not only, as above noted, to completely break up and pulverize the surface so as to provide a suitable grain bed which fills any cracks or seams in the surface and effects the covering of the grain without disposing the same at too great a depth for proper germination and sprouting, but leaves the surface of the soil in a relatively smooth and level condition, and moreover the stated or indicated arrangement of the teeth or bits adapts them to pass through the stubble, and loose stalks or manure which may be spread upon the surface of the soil without collecting the same or becoming choked or clogged thereby or causing a bodily transfer of such loose material from one portion of the surface of the field to another. The material on the surface is shifted laterally by contact with the teeth or bits but is not caught and dragged forward therewith, as would be the case if the bits or teeth were arranged even in pairs in transverse alignment. It will be observed that the arrangement described provides for the staggered relation of adjacent bits or teeth in both directions, and by locating the larger or broader bits or teeth in rear of the transverse lines of the narrower bits or teeth, an efficient covering of the seed is secured and the soil after having been traversed by the machine is in proper surface condition for the proper and fruitful growth of the crop.

Having thus described the invention, what we claim is:

A cultivating machine having a row of cultivating elements disposed substantially transverse to the path of travel, cultivating elements disposed in staggered relation and substantially transverse to the path of travel and in advance of the elements of said row, a plurality of the second mentioned elements being disposed between the longitudinal planes of each pair of first mentioned elements, the first mentioned elements at their work portions being wider than the second mentioned elements at their work portions, whereby the latter work portions will not throw large lumps.

In testimony whereof we affix our signatures in presence of two witnesses.

JOSEPH THOMA.
ALVIN J. THOMA.

Witnesses:
  Jos. O. Meyers,
  Evan J. Hughes.